Jan. 2, 1962 K. HEHL 3,015,131
CLAMPING MECHANISM FOR MOLDING PRESS
Filed June 5, 1959 3 Sheets-Sheet 1

FIG. I.

INVENTOR
Karl Hehl

BY George H Spencer
ATTORNEY

Jan. 2, 1962   K. HEHL   3,015,131
CLAMPING MECHANISM FOR MOLDING PRESS
Filed June 5, 1959   3 Sheets-Sheet 3

INVENTOR
Karl Hehl

BY George B. Spencer
ATTORNEY

United States Patent Office 3,015,131
Patented Jan. 2, 1962

3,015,131
CLAMPING MECHANISM FOR MOLDING PRESS
Karl Hehl, Lossburg, Wurtemberg, Germany, assignor to Arburg-Feingeratefabrik oHG Hehl & Sohne, Lossburg, Wurttemberg, Germany
Filed June 5, 1959, Ser. No. 818,337
Claims priority, application Germany June 7, 1958
4 Claims. (Cl. 18—30)

The present invention relates to a hydraulically or pneumatically operated clamping mechanism for a molding press for plastic materials.

It is an object of the present invention to provide a toggle lever clamping mechanism for a molding press, said mechanism being adjustable to receive molds of different sizes without requiring a change in the position of the hydraulic or pneumatic power unit.

It is another object of the invention to transmit the force from the power unit to the movable platen of the toggle lever clamping mechanism in such a manner that said movable clamping platen is operated without being jammed due to tilting.

It is a further object of the invention to provide an articulated multi-armed lever system for transmitting the force of the power unit to the movable clamping platen in such a manner, that the force delivered by the power unit results in a greater pressure on the movable clamping platen than that which would be obtained by direct transmission.

It is a still further object of the invention to transmit the clamping force obtained from a hydraulic or pneumatic power unit to the center of the clamping platen via a multi-armed lever system, said platen being slidably mounted on parallel guide rods between a fixed or stationary platen and a thrust plate.

It is another object of the invention to mount the power unit so that it can swing about a pivot pin associated with said thrust plate, the axis of this pivot pin lying on a line interconnecting the intersections of the diagonals of the movable clamping platen and of the thrust plate, respectively.

It is an additional object of the invention to provide means for adjusting said pivot pin in the direction of the longitudinal axis of the clamping mechanism, so as to adapt the gap between the clamping platens to receive molds of varying size up to a certain maximum.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
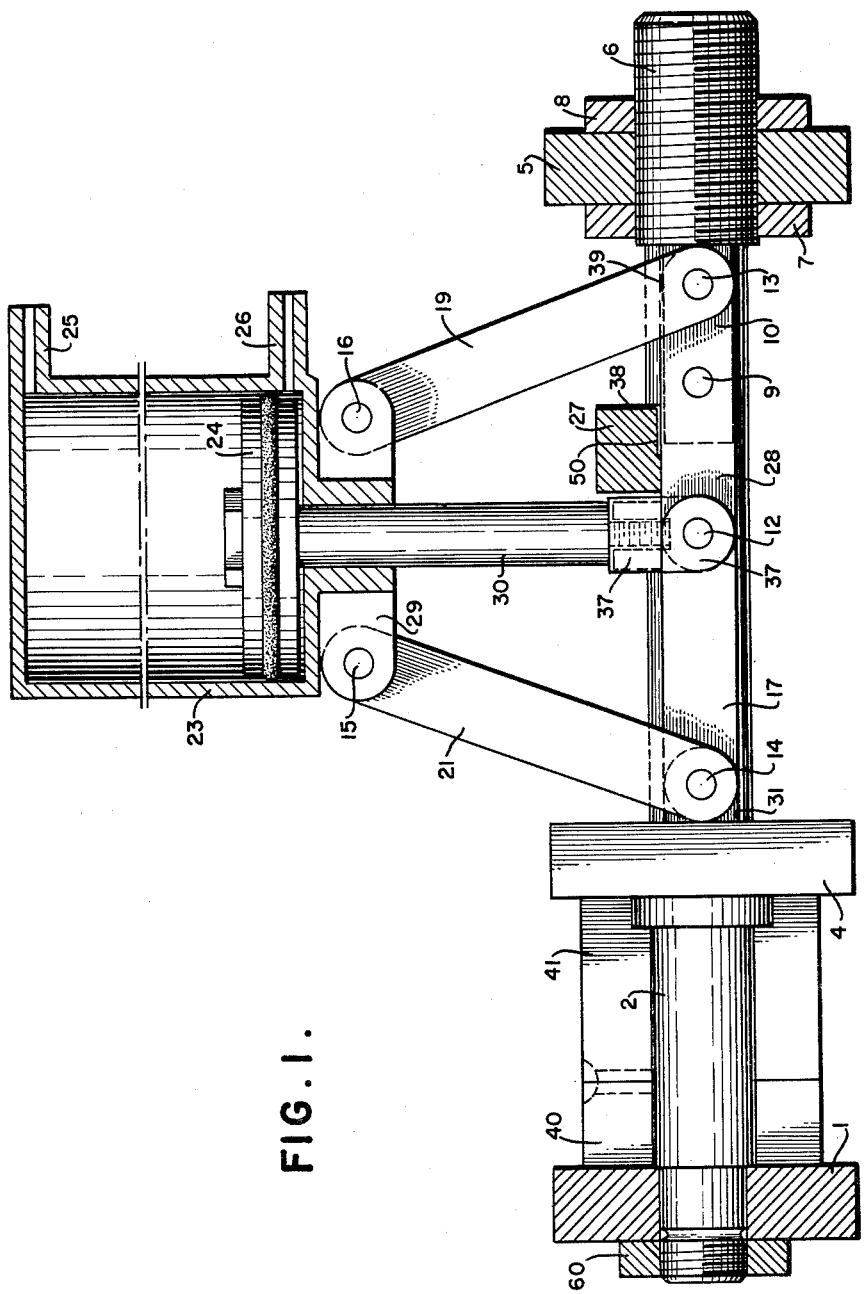
FIGURE 1 shows a side view of a molding press and toggle lever clamping mechanism according to the invention, with the clamping mechanism in locking position, parts of the mechanism being illustrated in section.
Figure 3:
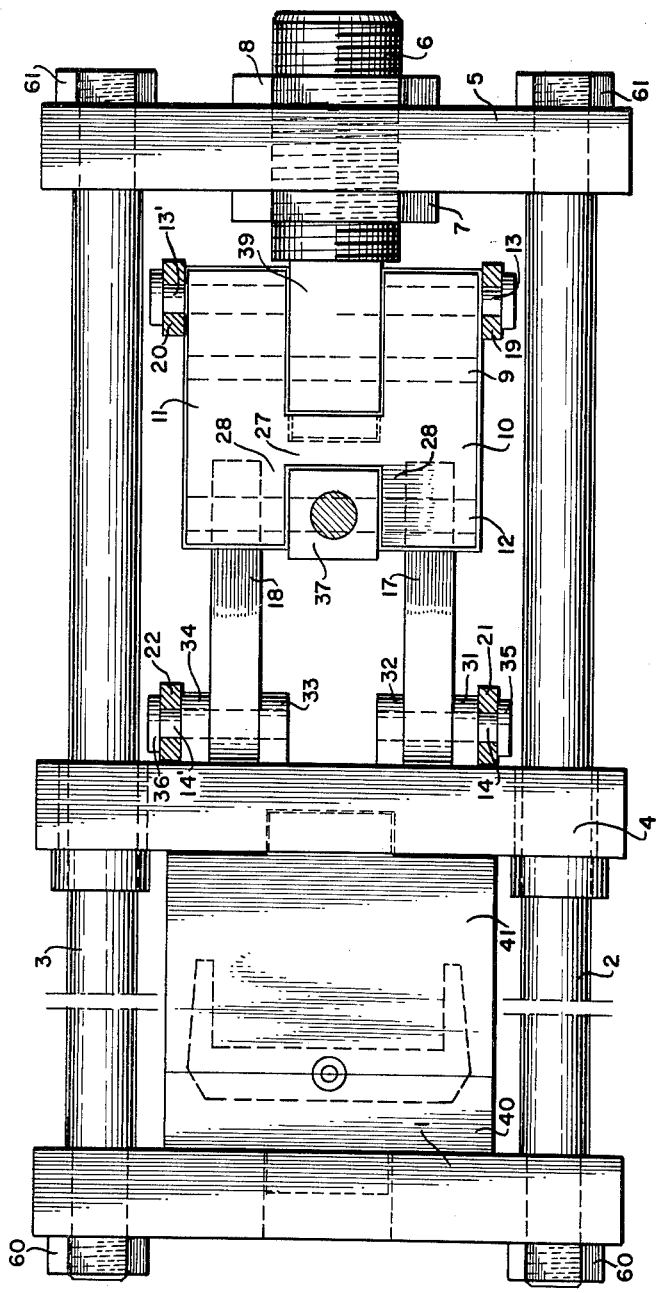
FIGURE 3 is a top view of the toggle lever clamping mechanism shown in FIGURE 1 in locking position, the power unit being omitted.

The toggle lever clamping mechanism according to FIGURES 1 and 3 comprises a fixed or stationary platen 1 mounted on the ends of parallel guide rods 2, 3 (FIGURE 3), a movable platen 4 slidable on said guide rods 2, 3 and a thrust plate 5 mounted on the opposite ends of the guide rods 2, 3. Nuts 60 and 61 on the threaded ends of these guide rods 2 and 3 serve to secure the platen 1 and the plate 5 thereon. A mold 40, 41 comprising several parts is inserted between the platens 1 and 4, i.e., parts of this mold are mounted in a suitable manner on said fixed platen 1 and other parts of the mold on said movable platen 4.

A threaded bolt 6 extends through a bore in the center of said thrust plate 5 and is secured thereto by means of nuts 7 and 8 on the bolt 6, said thrust plate being held between these nuts. A pivot pin 9 is inserted in a transverse bore through that end of the bolt 6 which engages a recess in a bell crank lever 28, said recess dividing the crank lever 28 into two portions 10 and 11 which are rigidly or integrally joined by means of a cross member or web 27. The bolt 6 thus serves as an adjustable pivot support for the pin 8.

This crank lever 28 forms part of a linkage system including the portions 10 and 11 of this crank lever, toggle levers 17 and 18 hinged to the crank lever 28 by means of a toggle pin 12 and hingedly connecting to the movable platen 4 with the aid of toggle pins 14 and 14', respectively, mounted in pairs of eyes 31, 32 and 33, 34, respectively, forming brackets on the movable platen 4 for these toggle pins 14 and 14', said toggle levers 17 and 18 being inserted between the eyes 31, 32, and 33, 34, respectively. In addition to this, levers 19 and 20 are hingedly connected to the crank lever 28 by means of pins 13 and 13', respectively, and levers 21 and 22 are hinged to the brackets 31, 32 and 33, 34, respectively, by means of the pins 14 and 14', respectively, i.e., are held on these pins between pin heads 35 and 36, respectively, and the outer walls of the eyes 31 and 34, respectively. This linkage system is symmetrical, i.e., the axis of symmetry passes through the toggle pin 12 and the center plane of a hydraulic or pneumatic power unit comprising a cylinder 23, a piston 24 with a piston rod 30, fluid within this cylinder 23 and conduit or hose connections 25 and 26 thereto.

The upper ends of the levers 21 and 22 and of the levers 19 and 20 are spaced and interconnected by means of transverse pins 15 and 16, respectively, extending through horizontal bores in a base plate 29 of the power unit 23 to 26 and 30. Thus, these levers constitute an articulated connection with the power unit which is swingably supported by the linkage system 10 to 22.

The portions 10 and 11 of said crank lever 28 are pivotally connected to the piston rod 30 by means of the transverse or toggle pin 12 and a member 37.

Figure 2:
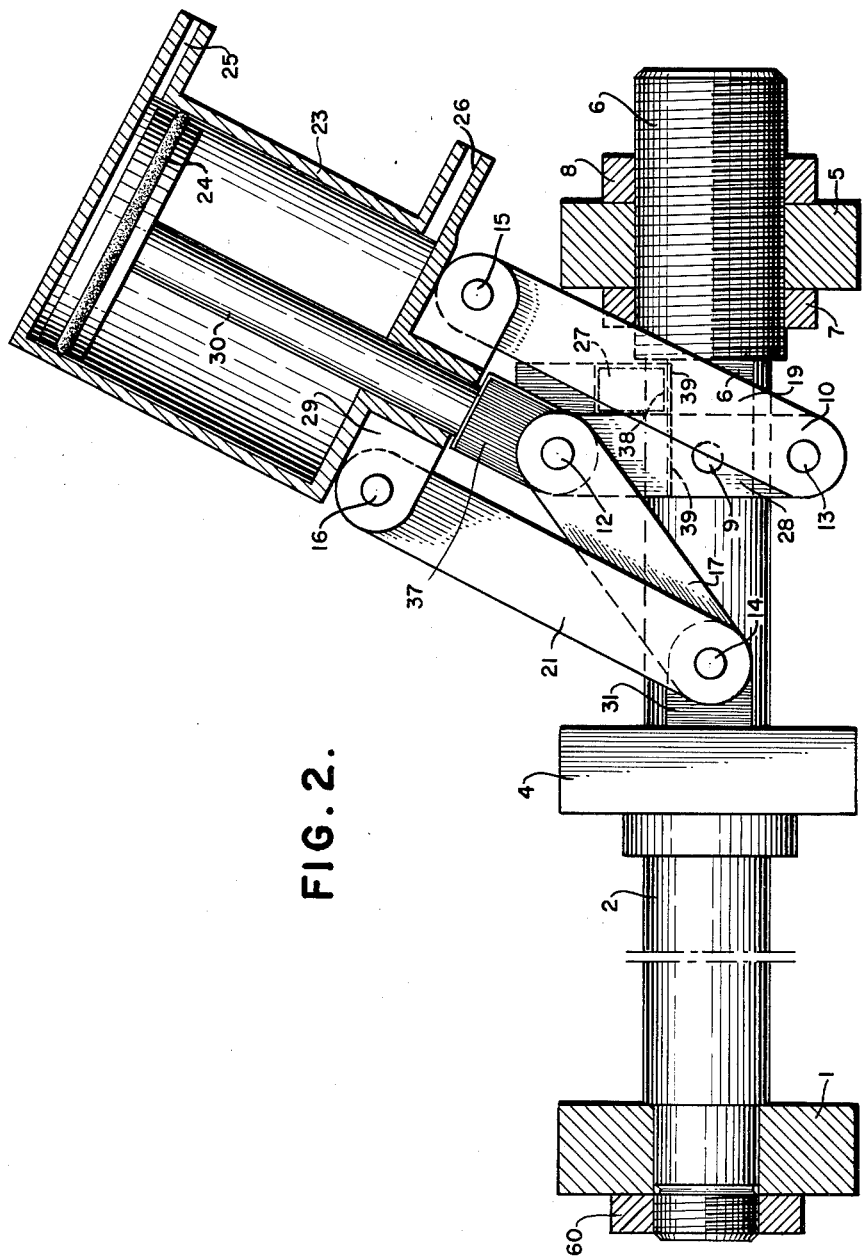
FIGURE 2 illustrates the apparatus shown in FIGURE 1, but with the clamping mechanism in the open or unlocking position.

The operation of the described clamping mechanism is as follows:

When the clamping mechanism is open, i.e., in unlocking position, as shown in FIGURE 2, the piston 24 of the power unit 23 to 26 and 30 is in the uppermost position. A liquid or gas entering the cylinder 23 under pressure via the inlet hose connection 25 will cause the piston 24 and the piston rod 30 to move downwardly. This downward movement of the piston rod 30, in turn, causes a downward movement of the toggle pin 12 and turning of the toggle levers 17, 18 and of the crank lever 28, whereby these toggle levers finally become horizontally aligned with the longitudinal axis of the crank lever 28. During the stroke of the piston 24, the entire linkage system together with the power unit carries out a swinging movement about the pivot pin 9 which is fixed, whereby the toggle pin 12 describes an arc around the pivot pin 9, while the ends of toggle levers 17 and 18, hingedly attached to the movable platen 4 by means of the toggle pins 14 and 14', respectively, are displaced together with the platen 4 in the longitudinal direction of the clamping mechanism.

Simultaneously, during the downward stroke of the piston 24, the pivot pins 13 and 13' describe an arc about the fixed pivot pin 9 resulting in a rocking movement of the base plate 29 together with the power unit 23 to 26 and 30. In the open position of the clamping mechanism, this power unit is at an oblique angle of about 45° with respect to the longitudinal axis of the clamping mechanism (see FIGURE 2), while the power unit is at right angles with respect to the longitudinal axis of the clamping mechanism when the clamping mechanism is in locking position (as shown in FIGURE 1). When the locking movement is completed, the toggle link means constituted by the toggle levers 17 and 18 and the toggle link means constituted by the crank lever 28 are aligned in the center plane of the clamping mechanism, and the distance between the fixed platen 1 and the movable platen 4 is shortest. In this position, a mold inserted between the platens 1 and 4 is held closed.

The downward movement of the toggle levers 17 and 18 is limited by an abutment 50 engaged by an edge 38 of the threaded bolt 6 when the levers 17 and 18 are aligned with the crank lever 28. The exact operation will be declared at the end of the description. The opposite movement of the toggle levers 17 and 18 with respect to the crank lever 28 is limited by the abutment 50 engaging an edge 39 of the threaded bolt 6 at the maximum opening position of the clamping mechanism.

During opening of the clamp device, i.e., when the clamp device is moved out of its clamping position, the toggle link means 17, 18, and the toggle link means 28, will be pivoted about the pin 12 in such a manner that these two toggle link means will be folded toward the power unit.

Since the size of the articles to be molded and, therefore, the size of the molds required may vary within wide limits, there are provided, according to the invention, means to adjust the minimum distance between the stationary platen 1 and the movable platen 4 to fit the respective size of the mold. Such adjustments are made when the toggle levers 17 and 18 and the crank lever 28 are fully aligned by tightening the nut 7 until the parts of the mold inserted between the platens 1 and 4 are pressed together at a pressure required for the article to be molded. Subsequently, the position of the thrust plate 5 thus obtained is fixed by tightening the opposite nut 8.

The invention effectively prevents the movable platen from tilting and, thereby obviates excessive strain on the slide bearings of this movable platen and possible inaccuracies in the registry and proper interlocking of the parts of the mold.

Moreover, the invention makes possible adjusting of the opening width between the platens from a minimum to a maximum, as required for different size molds to be clamped therebetween without changing the position of the power unit, since the latter is movably supported on a linkage system.

Finally, the power transmission by means of the linkage or lever system according to the invention makes it possible to apply pressures on the mold which are a multiple of those produced by the hydraulic or pneumatic cylinder of the power unit. In case of direct power transmission, extremely large hydraulic or pneumatic power units would be necessary to obtain such high pressure action.

I have also to remark in explaining the operation of my device:

In the extended position of the levers 17, 18 and 28 the cross-piece 27 engages with its abutment 50 an upper surface 39 of the threaded bolt 6, while in the opening position of the clamping mechanism, the abutment 38 of the cross-piece 27 engages the surface 39 of the threaded bolt 6.

What is claimed is:

1. A power-operated mold clamping mechanism for injection molding comprising, in combination: a clamp device including a stationary platen, parallel guide rods mounted on said platen, a thrust plate secured to said guide rods, a pivot support adjustably mounted on said thrust plate, and a movable platen slidably mounted on and along said guide rods between said stationary platen and said thrust plate; a fluid-actuated power unit including a cylinder, a piston reciprocating therein, and a piston rod attached to said piston; and toggle lever linkage means operatively connecting said cylinder and piston rod of said power unit between said thrust plate and said movable platen of said clamp device for moving said movable platen relative to said stationary platen and maintaining said clamp device in a clamping position upon the introduction of a pressure fluid medium into said power unit, said toggle lever linkage means constituting the sole connection between said clamping device and said power unit and allowing the latter to be rocked with respect to the former when said piston is displaced in said cylinder, said toggle lever linkage means having two pivotally connected toggle link means which, when said clamp device is moved out of its clamping position, are folded toward said power unit, the juncture of said toggle link means being connected with said piston rod of said power unit, one of said toggle link means being pivotally connected with said movable platen, and the other of said toggle link means being pivotally connected with said adjustable pivot support of said thrust plate, whereby the minimum distance between said stationary and movable platens of said clamping mechanism may be adjusted.

2. A power-operated mold clamping mechanism according to claim 1, wherein the plane of symmetry of said power unit passes through the longitudinal center axis of said mold clamping mechanism.

3. A power-operated mold clamping mechanism as defined in claim 1, wherein said pivot support comprises a threaded bolt extending parallel to said guide rods.

4. A power-operated mold clamping mechanism according to claim 3, wherein abutments are provided on said threaded bolt to limit the movement of said toggle link means in the opening and closing positions of said mechanism.

References Cited in the file of this patent

UNITED STATES PATENTS

| 2,309,460 | Lester | Jan. 26, 1943 |
| 2,711,567 | Knapp | June 28, 1955 |

FOREIGN PATENTS

| 707,815 | Great Britain | Apr. 21, 1954 |